United States Patent [19]

Kitajima et al.

(10) Patent No.: US 7,314,192 B2
(45) Date of Patent: Jan. 1, 2008

(54) SPINNING REEL

(75) Inventors: Keigo Kitajima, Sakai (JP); Koji Ochiai, Sakai (JP); Yutaka Inoue, Sakai (JP); Kei Saito, Sakai (JP)

(73) Assignee: Shimano Inc., Osaka (JP)

( * ) Notice: Subject to any disclaimer, the term of this patent is extended or adjusted under 35 U.S.C. 154(b) by 42 days.

(21) Appl. No.: 11/439,349

(22) Filed: May 24, 2006

(65) Prior Publication Data

US 2006/0266861 A1   Nov. 30, 2006

(30) Foreign Application Priority Data

May 31, 2005 (JP) ............................. 2005-158424
May 31, 2005 (JP) ............................. 2005-158425

(51) Int. Cl.
*A01K 89/00* (2006.01)

(52) U.S. Cl. ..................................... 242/321; 242/322

(58) Field of Classification Search ............... 242/249, 242/310, 311, 317, 321, 322; 384/535, 536, 384/537
See application file for complete search history.

(56) References Cited

U.S. PATENT DOCUMENTS

| 2,650,866 A | * | 9/1953 | Knudson | 384/537 |
| 3,301,612 A | * | 1/1967 | Thomas | 384/536 |
| 4,778,124 A | * | 10/1988 | Shinohara | 242/230 |
| 5,427,324 A | | 6/1995 | Kawashiro | |
| 5,826,987 A | * | 10/1998 | Beaman | 384/517 |
| 6,536,953 B1 | * | 3/2003 | Cope et al. | 384/536 |
| 6,598,819 B2 | * | 7/2003 | Furomoto | 242/319 |
| 6,607,154 B2 | * | 8/2003 | Hitomi | 242/322 |
| 2002/0125358 A1 | * | 9/2002 | Takikura | 242/319 |
| 2002/0170997 A1 | * | 11/2002 | Furomoto | 242/246 |
| 2003/0001035 A1 | * | 1/2003 | Hitomi | 242/322 |
| 2007/0009194 A1 | * | 1/2007 | Schelbert | 384/537 |

FOREIGN PATENT DOCUMENTS

| EP | 1 269 838 | 1/2003 |
| EP | 1 273 227 | 1/2003 |
| GB | 2 318 492 | 4/1998 |
| JP | 59-170466 U | 11/1984 |
| JP | 11-206287 | 8/1999 |
| JP | 11-206287 A | 8/1999 |
| JP | 2001-190193 A | 7/2001 |
| JP | 3563656 B2 | 6/2004 |
| JP | 2004-261076 A | 9/2004 |

* cited by examiner

*Primary Examiner*—Peter M. Cuomo
*Assistant Examiner*—Evan H. Langdon
(74) *Attorney, Agent, or Firm*—Global IP Counselors, LLP

(57) ABSTRACT

A spinning reel has a reel main unit, a spool shaft and a pinion gear. The pinion gear has a frontward section, an intermediate section and a rearward section. The intermediate section and the rearward section are supported in a freely rotatable manner in the reel main unit by a first support part and a second support part, respectively. The spool shaft passes through an internal circumference of the pinion gear. The spool shaft is supported in a freely rotatable manner at a position frontward of the frontward section by a third support part and at a position rearward of the rearward section by a fourth support part.

11 Claims, 12 Drawing Sheets

SPINNING REEL

CROSS-REFERENCE TO RELATED APPLICATIONS

This application claims priority under 35 U.S.C. § 119 to Japanese Patent Application Nos. 2005-158424 and 2005-158425. The entire disclosure of Japanese Patent Application Nos. 2005-158424 and 2005-158425 is hereby incorporated herein by reference.

BACKGROUND OF THE INVENTION

1. Field of the Invention

The present invention relates to a spinning reel. More particularly, the present invention relates to a spinning reel configured to be mounted to a fishing rod for reeling out a fishing line in a forward direction.

2. Background Information

A spinning reel is generally configured to wind a fishing line about an axis generally parallel to the axial direction of a fishing rod. A conventional spinning reel includes a reel main unit, a spool, a rotor and a rotor drive mechanism. The reel main unit has a handle and is configured to be mounted to a fishing rod. The spool is mounted to the reel main unit in such a fashion that it can move to and fro along a longitudinal direction. The rotor is configured and arranged to guide the fishing line to the spool. The rotor drive mechanism is configured to rotate the rotor when the handle is rotated.

The rotor drive mechanism has a face gear and a pinion gear. The pinion gear is arranged and configured to mesh with the face gear. The handle is non-rotatably mounted to the face gear. The pinion gear is a tubular member made of brass that is arranged along a longitudinal direction of the reel main unit and rotatably supported by the reel main unit.

A toothed section is configured to mesh with the face gear. The toothed section is formed on an outside circumference of a rearward portion of the pinion gear. A mounting section for non-rotatably mounting the rotor to the pinion gear is provided on an outside circumference of a frontward portion of the pinion gear. An externally threaded section is formed on the mounting section. A nut member for fastening the rotor is installed onto the externally threaded section. The spool is mounted on a frontward end of a spool shaft. The spool shaft passes through an internal circumference of the pinion gear. The spool shaft is supported on the internal circumference of the pinion gear such that the spool shaft moves freely to and fro in the longitudinal direction. The spool shaft is made of a stainless steel alloy. The spool shaft contacts an entire length of the internal circumference of the pinion gear.

Since the spool shaft is supported by the entire length of the internal circumference of the pinion gear in this conventional spinning reel structure, the contact pressure between the internal circumference of the pinion gear and the spool shaft increases when a large load acts on the spool and causes the spool shaft to flex. Consequently, there are times when a friction force between the spool shaft and the pinion gear increases, making it more difficult for the pinion gear to rotate. As a result, the rotation efficiency of the rotor declines and the efficiency with which the fishing line is wound (reeled in) declines.

One known method of resolving this problem is to provide a gap between the internal circumference of the pinion gear and the spool shaft and provide a pair of support parts that are arranged in frontward and rearward portions, respectively, inside the pinion gear. The support parts are configured to support the spool shaft in such a fashion that the spool shaft freely moves along the axial direction (see, for example, Japanese Laid-open Patent Publication No. 11-206287). This approach makes it more difficult for the friction force to increase between the spool shaft and the rotor when the spool shaft flexes and thus, suppresses the tendency for the rotation efficiency of the rotor to decline.

However, since the spool shaft is supported on the pair of support parts provided inside frontward and rearward portions of the internal circumference of the pinion gear, an outer circumference of the spool shaft contacts the support parts of the pinion gear. Thus, when the spool shaft moves in the longitudinal direction, the outer circumference of the spool shaft is in sliding contact with the support parts of the pinion gear. Consequently, there is the possibility that the contact pressure between the support parts of the pinion gear and the outer circumference of the spool shaft will increase and cause the friction force between the spool shaft and the pinion gear to increase. If the friction force between the spool shaft and the pinion gear increases, the pinion gear will not rotate as readily and the rotation efficiency of the rotor could decline further.

In view of the above, it will be apparent to those skilled in the art from this disclosure that there exists a need for an improved spinning reel that suppresses a decline in rotation efficiency of the rotor. This invention addresses this need in the art as well as other needs, which will become apparent to those skilled in the art from this disclosure.

SUMMARY OF THE INVENTION

A spinning reel in accordance with a first aspect of the present invention is a spinning reel configured to be mounted to a fishing rod and capable of reeling out a fishing line in a forward direction. The spinning reel includes a reel main unit, a spool shaft, a spool, a rotor, a face gear, a pinion gear, a nut member, a first support part, a second support part, a third support part and a fourth support part. The reel main unit is configured to be mounted to the fishing rod and has a handle. The spool shaft is installed in the reel main unit. The spool shaft is movable along a longitudinal direction. The spool is mounted on a frontward end of the spool shaft and is configured to have the fishing line wound onto an outer circumference of the spool. The rotor is arranged to rotate around the outer circumference of the spool and is configured to wind the fishing line onto the spool. The face gear is rotatably supported on the reel main unit. The handle of the reel main unit is non-rotatably mounted to the face gear. The pinion gear has a cylindrical portion, a toothed section, and a mounting section. The cylindrical portion has an internal circumference that is configured and arranged for the spool shaft to pass through the internal circumference with a gap between the spool shaft and the internal circumference. The toothed section is disposed on an outside circumference of a rearward section of the cylindrical portion and configured to mesh with the face gear. The mounting section is disposed on an outside circumference of a frontward section of the cylindrical portion. The mounting section is configured to be attached in a non-rotatable manner to the rotor. The nut member is disposed at a frontward end of the cylindrical portion to fasten the rotor to the mounting section of the pinion gear. The first support part is mounted in the reel main unit to rotatably support the cylindrical portion. The second support part is mounted in the reel main unit in a position rearward of the first support part to rotatably support the cylindrical portion. The third support part is mounted in the nut member to support the spool shaft at a position frontward of the frontward end of the cylindrical portion. The fourth support part is configured to support the spool shaft at a position rearward of a rearward end of the cylindrical portion.

In this spinning reel, an outer circumference of the spool shaft is supported at a position frontward of the frontward end of the cylindrical portion of the pinion gear by the third support part and at a position rearward of the rearward end of the cylindrical portion by the fourth support part. Thus, a gap is produced between the spool shaft and the internal circumference of the pinion gear across an entire length. Since the outside circumference of the spool shaft does not contact the internal circumference of the pinion gear, the friction force between the spool shaft and the pinion gear is less likely to increase due to flexure or longitudinal movement of the spool shaft and the tendency of the rotation efficiency of the rotor to decline can be suppressed further.

A spinning reel in accordance with a second aspect of the present invention is a spinning reel according to the first aspect, wherein the second support part is arranged such that a frontward end portion of the internal circumference thereof supports the rearward end of the cylindrical portion and the fourth support part is installed into a rearward end portion of the internal circumference of the second support part. With this spinning reel, the spool shaft support structure is simplified because the second support part supports both the rearward end of the cylindrical portion and the fourth support part.

A spinning reel in accordance with a third aspect of the present invention is a spinning reel according to the second aspect, wherein the fourth support part is arranged in such a fashion that the rearward end thereof is positioned in a same position of the rearward end of the second support part or further frontward than the rearward end of the second support part. Since the rearward end of the fourth support part is positioned further frontward than the rearward end of the second support part, the fourth support part is positioned further forward and the length of the entire spool shaft support structure in the longitudinal direction is shortened. Thus, since the spool shaft support structure can be made more compact, the reel as a whole can be prevented from increasing in size. Additionally, since the fourth support part is positioned in the same position of the rearward end of the second support part or further frontward, interference between the fourth support part and the face gear is prevented even when a large diameter face gear is used.

A spinning reel in accordance with a fourth aspect of the present invention is a spinning reel according to the first aspect, wherein the second support part is arranged in such a position as to support a portion of the cylindrical portion that is located further frontward than the toothed section and the fourth support part is installed in the reel main unit. Since the first support part and the second support part are arranged in positions where they support portions of the cylindrical portion located further frontward than the toothed section, the overall length of the pinion gear in the longitudinal direction is shortened and the reel as a whole is prevented from increasing in size.

A spinning reel in accordance with a fifth aspect of the present invention is a spinning reel according to any one of the first to fourth aspects, wherein the first support part and the second support part are rolling bearings. By using rolling bearings, which generally have low coefficients of friction, the pinion gear is made to rotate with a comparatively small force.

A spinning reel in accordance with a sixth aspect of the present invention is a spinning reel according to any one of the first to fifth aspects, wherein the fourth support part is a sliding bearing. With this spinning reel, the spool shaft is supported with an inexpensive structure because a general-purpose sliding bearing, e.g., a tubular bushing member, is used.

A spinning reel in accordance with a seventh aspect of the present invention is a spinning reel according to the sixth aspect, wherein the fourth support part is a member made of a synthetic resin. By using a bushing member made of synthetic resin, the cost of the support structure is reduced and the corrosion resistance is improved in comparison with a structure employing a metal bushing.

A spinning reel in accordance with an eighth aspect of the present invention is a spinning reel according to any one of the first to seventh aspects, wherein the spool shaft and the pinion gear are each made of a stainless steel alloy. Since the internal circumference of the pinion gear and the outside circumference of the spool shaft do not contact each other, this spinning reel eliminates the possibility of the internal circumference of the pinion gear and the outside circumference of the spool shaft contacting each other and becoming fused together, which can occur in conventional spinning reels in which the support parts are provided inside the internal circumference of the pinion gear.

A spinning reel in accordance with a ninth aspect of the present invention is a spinning reel according to any one of the first to eighth aspects, wherein the spool shaft having a first shaft section is configured such that the rearward end thereof is positioned frontward of the fourth support part, and is arranged such that the outside circumference thereof is supported by the third support part and a second shaft section that is formed on the rearward end of the first shaft section, has a smaller diameter than the first shaft section, and is arranged such that the outside circumference thereof is supported by the fourth support part.

In this spinning reel, the spool shaft has a first shaft section provided in front and a second shaft section that is provided in the rear. The first shaft section has a smaller diameter than the first shaft section, and is supported on the fourth support part. Since the second shaft section supported on the fourth support part has a smaller diameter than the first shaft section, the unit weight of the second shaft section at the fourth support part is reduced in comparison with a conventional configuration in which the larger diameter first shaft section is supported on a pair of support parts provided inside the pinion gear. Likewise, by reducing the unit weight of the second shaft section at the fourth support part, the friction force between the fourth support part and the spool shaft is reduced and the tendency of the sliding efficiency of the spool shaft to decline is suppressed.

A spinning reel in accordance with a tenth aspect of the present invention is a spinning reel according to the ninth aspect, wherein the first shaft section is configured such that the rearward end thereof is positioned frontward of the rearward end of the pinion gear. With this spinning reel, since the rearward end of the first shaft section is always positioned further frontward than the rearward end of the pinion gear, the frontward end of the second shaft section is positioned further frontward than the rearward end of the pinion gear.

With the present invention, the outside circumference of the spool shaft of the spinning reel is supported at a position frontward of the frontward end of the cylindrical portion of the pinion gear by the third support part and at a position rearward of the rearward end of the cylindrical portion by the fourth support part. As a result, since the outside circumference of the spool shaft does not contact the internal circumference of the pinion gear, the friction force between the spool shaft and the pinion gear is less likely to increase due to flexure or longitudinal movement of the spool shaft and the tendency of the rotation efficiency of the rotor to decline is suppressed further.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
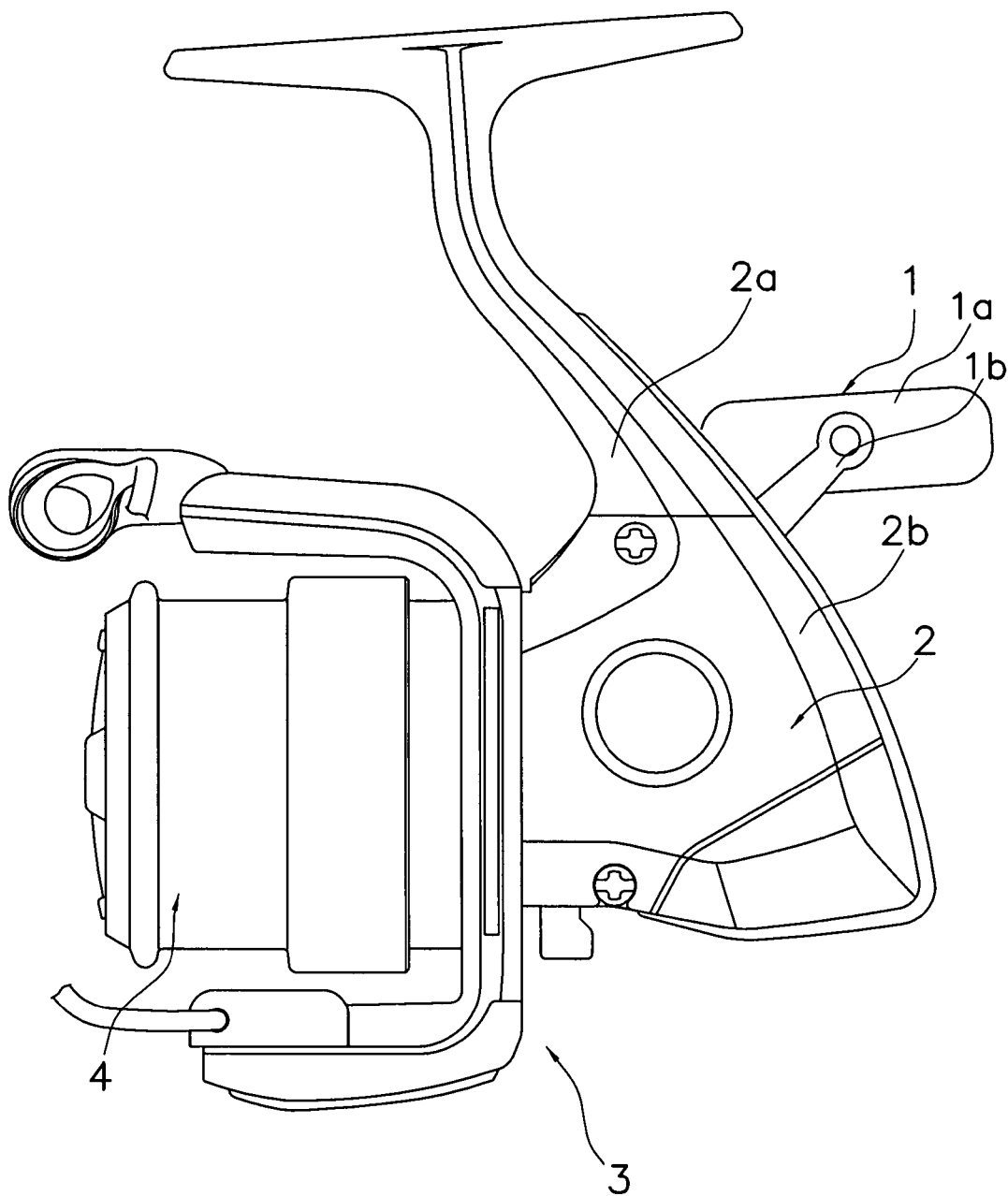
FIG. 1 is a left side view of a spinning reel in accordance with a first embodiment of the present invention.
Figure 2:
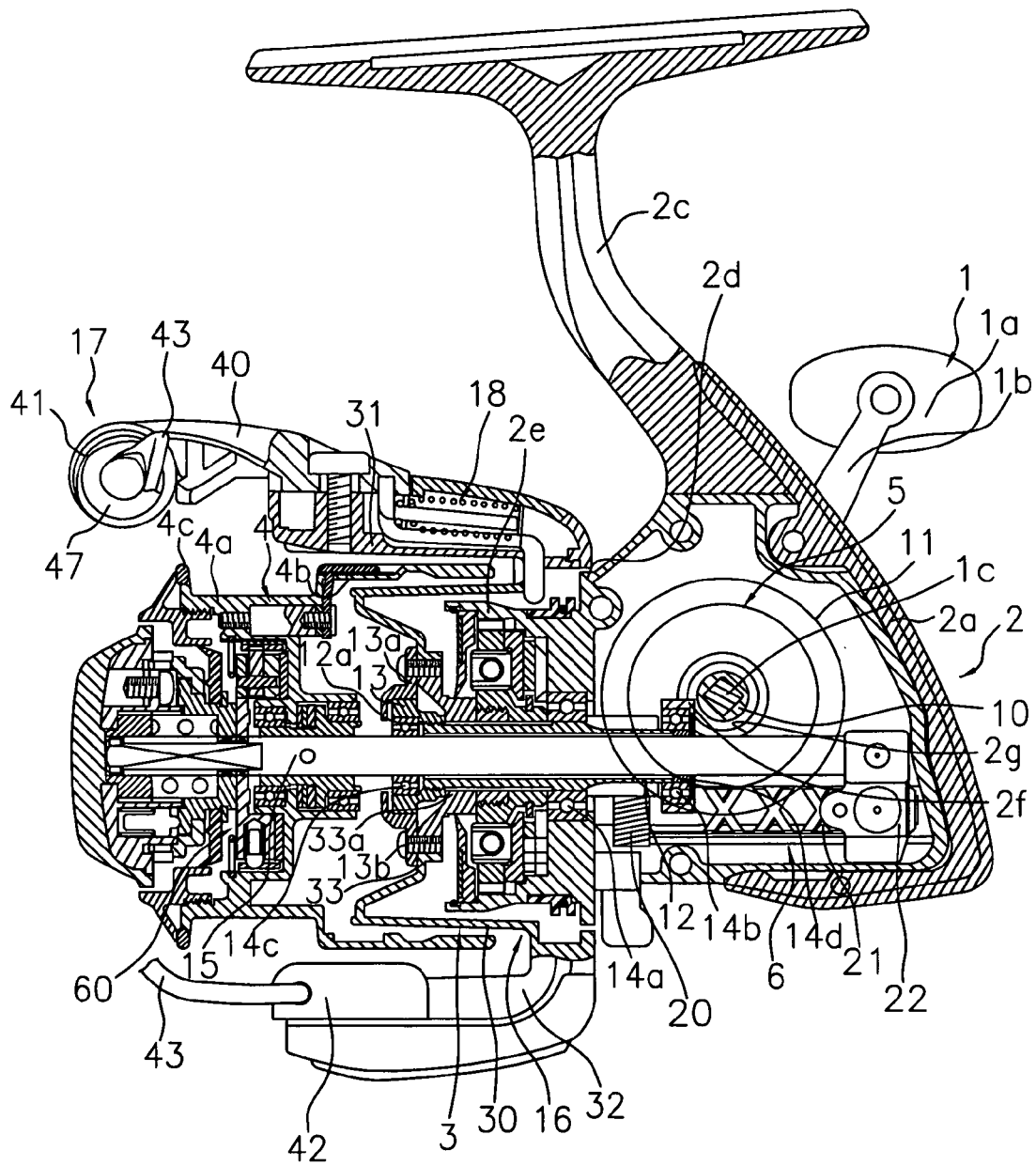
FIG. 2 is a left side cross sectional view of the spinning reel in FIG. 1 in accordance with the first embodiment of the present invention.

Referring initially to FIGS. 1 and 2, a spinning reel is illustrated in accordance with a first embodiment of the present invention. The spinning reel includes a handle 1, a reel main unit 2, a rotor 3, and a spool 4. The reel main unit 2 rotatably supports the handle 1. The rotor 3 is rotatably supported on a frontward portion of the reel main unit 2. The spool 4 is arranged on a frontward portion of the rotor 3 in such a fashion that the spool 4 freely moves to and fro along a longitudinal direction. The longitudinal direction is generally parallel to an axial direction of a fishing rod. A fishing line is wound on an outer circumference of the spool 4. The handle 1 is mounted to either a left side of the reel main unit 2, as shown in FIG. 1, or a right side of the reel main unit 2, as shown in FIG. 2.

The handle 1 has a T-shaped handle grip 1a, a handle arm 1b and a handle shaft part 1c. The handle grip 1a is rotatably mounted on a tip end of the handle arm 1b. The handle shaft part 1c is provided on a base end of the handle arm 1b. The handle shaft part 1c is configured to extend in a direction that intersects with the handle arm 1b.

The reel main unit 2 has a reel body 2a and a lid member 2b. The reel body 2a has a space on an inside thereof. The lid member 2b is detachably mounted to the reel body 2a in order to obstruct the space inside the reel body 2a. The lid member 2b is made of, for example, an aluminum alloy. The lid member 2b is fastened to the reel body 2a with, for example, screws installed in three locations. As shown in FIG. 2, a rotor drive mechanism 5 and an oscillating mechanism 6 are provided inside the space of the reel body 2a. The rotor drive mechanism 5 is configured to rotationally interlock the rotor 3 with the handle 1. The oscillating mechanism 6 is configured to move the spool 4 to and fro in order to wind the fishing line in a uniform manner.

As shown in FIG. 2, the rotor drive mechanism 5 has a handle shaft 10, a face gear 11 and a pinion gear 12. The handle 1 is non-rotatably mounted on the handle shaft 10. The face gear 11 is arranged to rotate together with the handle shaft 10. The pinion gear 12 is arranged and configured to mesh with the face gear 11. The handle shaft 10 is non-rotatably mounted to the handle shaft part 1c.

The reel body 2a is made of, for example, an aluminum alloy. The reel body 2a has a T-shaped rod mounting leg 2c, a circular flange section 2d and a cylindrical section 2e. The rod mounting leg 2c is disposed on an upper portion of the reel body 2a. A top portion of the rod mounting leg 2c is configured and arranged to extend along the longitudinal direction. The circular flange section 2d and the cylindrical section 2e are formed on frontward ends of the reel body 2a and the lid member 2b. The cylindrical section 2e has a smaller diameter than the flange section 2d and opens at the frontward end thereof. A mounting groove cut with a bottom that has a circular arc shape in a cross sectional view is formed in the cylindrical section 2e.

Figure 3:
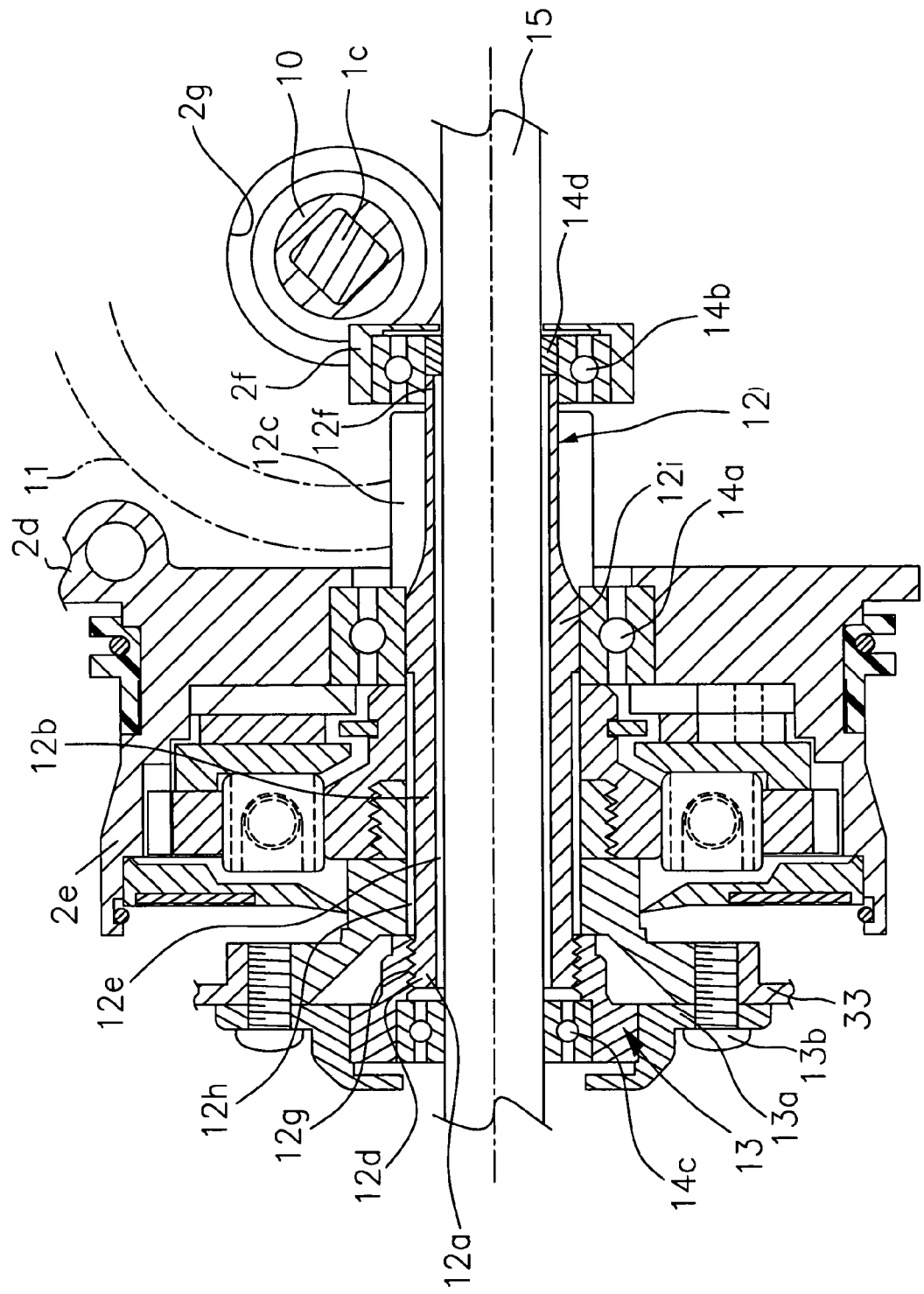
FIG. 3 is an enlarged partial side cross sectional view of a section of the spinning reel in FIGS. 1 and 2 surrounding a pinion gear in accordance with the first embodiment of the present invention.

As shown in FIGS. 2 and 3, a spool shaft 15 passes through a side portion of the reel body 2a. The reel main unit 2 further has a mounting recess 2f and an installation recess 2g. The mounting recess 2f is shaped like a bottomed cylinder and is formed in the side portion of the reel body 2a. The mounting recess 2f has a boss that is open at a frontward side of the mounting recess 2f. The mounting recess 2f has a through hole in a center at a bottom on a rearward side for passing the spool shaft 15. The mounting recess 2f is made by lathe cutting with a T slot cutter in a portion of the reel body 2a that protrudes to the side. A plurality of circular through holes (not shown) configured for insertion of the handle shaft 10 there-through is formed in the reel body 2a and a side portion of the lid member 2b. An installation recess 2g is configured such that a rolling bearing (not shown) for rotatably supporting the handle shaft 10 is housed therein. The installation recess 2g is formed around each of the circular through holes on inside surfaces of the reel body 2a and the lid member 2b.

Referring to FIG. 3, since the mounting recess 2f is formed by lathe cutting a T slot, the installation recess 2g is arranged in such a position that a portion of the rearward end of the mounting recess 2f overlaps with the installation recess 2g in a side view. Consequently, it is not necessary to execute machining to cut away a portion of the rearward end of the mounting recess 2f, as is required in the case of conventional spinning reels. Furthermore, a diameter of the installation recess 2g can be increased and, thus, the size of the rolling bearing (not shown) used to support the handle shaft 10 can be increased. As a result, a load that the rolling bearings can withstand can be increased.

As shown in FIG. 2, the rotor 3 has a rotor body 16, a bail arm 17 and a bail inverting mechanism 18. The bail arm 17 is mounted to a frontward end of the rotor body 16. The bail arm 17 is configured to pivot between a fishing line release position and a fishing line reel-in position. The bail inverting mechanism 18 is mounted to the rotor body 16. The bail inverting mechanism 18 is configured to return the bail arm 17 from the fishing line release position to the fishing line reel-in position when the rotor 3 is rotated. The bail inverting mechanism 18 is arranged inside a storage space of the first rotor arm 31. The bail inverting mechanism 18 holds the bail arm 17 in the fishing line release position or the fishing line reel-in position.

The rotor body 16 has a cylindrical section 30, a first rotor arm 31 and a second rotor arm 32. The cylindrical section 30 is mounted to the reel body 2a. The rotor body 16 is configured and arranged to freely rotate about the spool shaft 15. The first rotor arm 31 and the second rotor arm 32 are arranged on opposite sides of the cylindrical section 30. The cylindrical section 30, the first rotor arm 31 and the second rotor arm 32 are made of, for example, an aluminum alloy and formed as a one-piece unitary member.

A front wall 33 is formed on a front of the cylindrical section 30. The front wall 33 has a boss 33a in a center portion of the front wall 33. The boss 33a has a boss through hole that is formed through a center of the boss 33a. A nut member 13 for fastening the rotor 3 is arranged on a frontward side of the front wall 33.

A first bail support member 40 is mounted to an outside circumference of a frontward end of the first rotor arm 31. The first bail support member 40 freely moves in a pivot-like manner. A second bail support member 42 is mounted to an inside circumference of a frontward end of the second rotor arm 32. The second bail support member 42 freely moves in a pivot-like manner. A line roller 41 for guiding the fishing line onto the spool 4 is mounted to the frontward end of the first bail support member 40. A stationary shaft cover 47 is fastened to the frontward end of the first bail support member 40. The line roller 41 is mounted to the frontward end of the first bail support member 40 in such a fashion that the line roller 41 freely rotates. The stationary shaft cover 47 generally has a shape of an irregular cone with a pointed tip. A bail 43 has a piece of wire-like material bent into a generally U-like shape. The bail 43 is provided between a frontward end of the stationary shaft cover 47 and the second bail support member 42. Collectively, the first and second bail support members 40 and 42, the line roller 41, the bail 43 and the stationary shaft cover 47 constitute the bail arm 17, which serves to guide the fishing line to the spool 4.

The spool 4 is arranged between the first rotor arm 31 and the second rotor arm 32 of the rotor 3. The spool 4 is mounted on the frontward end of the spool shaft 15 with a drag mechanism 60 disposed there-between. The spool 4 has a bobbin trunk 4a, a skirt 4b and a flange 4c. The fishing line is wound around an outside circumference of the bobbin trunk 4a. The skirt 4b is integrally formed with a rearward portion of the bobbin trunk 4a. The flange 4c is integrally formed on a frontward end of the bobbin trunk 4a.

Referring to FIGS. 2 and 3, the pinion gear 12 of the rotor drive mechanism 5 is a tubular member made of a stainless steel alloy. The pinion gear 12 has a frontward section 12a, a cylindrical portion 12b, a toothed section 12c, a mounting section 12d, a gap 12e, a rearward section 12f, an externally threaded section 12g, a chamfered section 12h and an intermediate section 12i. Specifically, the frontward section 12a and the spool shaft 15 pass through the boss through hole of the boss 33a. The frontward section 12a passes through a center of the rotor 3. The frontward section 12a is fastened to the rotor 3 with the nut member 13. The intermediate section 12i is located rearward of the chamfered section 12h. The intermediate section 12i and the rearward section 12f of the pinion gear 12 are rotatably supported in the reel main unit 2 on a first support part 14a and a second support part 14b, respectively. The first and second support parts 14a and 14b each include a ball bearing as a rolling bearing.

As shown in FIG. 3, the pinion gear 12 rotates about an axis that is generally parallel to the longitudinal direction of the fishing rod. The spool shaft 15 passes through an internal circumference of the cylindrical portion 12b. The gap 12e is formed between the spool shaft 15 and the cylindrical portion 12b. The cylindrical portion 12b is made of a stainless steel alloy. The toothed section 12c is provided on an outside circumference of the rearward section 12f. The toothed section 12c is configured to mesh with the face gear 11. The toothed section 12c has helical-gear-like teeth formed on the outside circumference of the cylindrical portion 12b. The toothed section 12c is located between the intermediate section 12i and the rearward section 12f. The mounting section 12d is provided on an outside circumference of the frontward section 12a. The mounting section 12d is configured to be attached in a non-rotatable manner to the rotor 3.

As shown in FIG. 3, the chamfered section 12h is made up of opposing flat surfaces formed by chamfering the outside circumference of the frontward section 12a. The externally threaded section 12g is formed on a frontward side of the chamfered section 12h. The externally threaded section 12g is formed on an external circumferential surface of a frontward portion of the mounting section 12d. The nut member 13 is screwed onto the externally threaded section 12g. As shown in FIGS. 2 and 3, the nut member 13 has a retainer 13a and a plurality of screw members 13b. The retainer 13a prevents the nut 13 from rotating. The retainer 13a is fastened to the front wall 33 of the rotor 3 with the screw members 13b. The screw members 13b are installed from the front.

As shown in FIG. 3, the first and second support parts 14a and 14b are rolling bearings installed on the outside circumferences of the intermediate section 12i and the rearward section 12f of the cylindrical portion 12b. The outer race of the first support part 14a is mounted in an internal circumferential section of the cylindrical section 2e of the reel body 2 and the inner race is mounted to the intermediate section 12*i*. The second support part 14*b* is installed into the bottomed mounting recess 2*f* from the front. An outer race of the second support part 14*b* is mounted in an internal circumferential section of the mounting recess 2*f*. An inner race of the second support part 14*b* is mounted onto the rearward section 12*f*. The mounting recess 2*f* is configured for installment of the second support part 14*b* from the frontward side of the mounting recess 2*f*.

The outer race of the second support part 14*b* contacts the internal circumferential section of the mounting recess 2*f*. The outer race of the second support part 14*b* contacts only a portion of the bottom part (axially frontward-facing internal surface) of the mounting recess 2*f*. The inner race of the second support part 14*b* has an internal circumference with a frontward end portion that supports the outside circumference of the rearward section 12*f* and a rearward end portion that supports the outside circumference of a fourth support part 14*d*. The fourth support part 14*d* serves to support the spool shaft 15. A slight gap exists between the inner race of the second support part 14*b* and the bottom part of the mounting recess 2*f* and, thus, the inner race does not contact the bottom part of the mounting recess 2*f*.

As shown in FIGS. 2 and 3, the spool shaft 15 is made of a stainless steel alloy. The outside circumference of the spool shaft 15 is supported in a freely rotatable manner at a position frontward of the frontward section 12*a* of the pinion gear 12 by a third support part 14*c*. The spool shaft 15 is supported in a freely rotatable manner at a position rearward of the rearward section 12*f* by the fourth support part 14*d*.

As shown in FIG. 3, the third support part 14*c* is a rolling bearing mounted on the outer circumference of the spool shaft 15. An outer race of the third support part 14*c* is mounted in an internal circumferential section of a frontward end of the nut member 13. An inner race of the third support part 14*c* is mounted on the outer circumference of the spool shaft 15 at a position frontward of the frontward section 12*a* of the pinion gear 12.

As shown in FIG. 3, the fourth support part 14*d* is a tubular member made of a synthetic resin. Preferably, the fourth support part 14*d* constitutes a bushing or other general-purpose sliding bearing. The outside circumference of the fourth support part 14*d* is installed inside the internal circumference of the rearward end of the second support part 14*b*. An internal circumference of the fourth support part 14*d* is mounted on the outer circumference of the spool shaft 15 at a position rearward of the rearward section 12*f* of the pinion gear 12. Since the second support part 14*b* supports both the rearward section 12*f* and the fourth support part 14*d*, the support structure for the spool shaft 15 is simplified.

As shown in FIG. 2, the oscillating mechanism 6 serves to move the spool shaft 15 to and fro in the longitudinal direction and thereby move the spool 4 in the same direction. A center of the spool 4 is connected to the spool shaft 15. The oscillating mechanism 6 is a traverse cam mechanism. The oscillating mechanism 6 has an intermediate gear 20, a traverse cam shaft 21 and a slider 22. The intermediate gear 20 is configured and arranged to mesh with the toothed section 12*c* of the pinion gear 12. The traverse cam shaft 21 is mounted in the reel body 2*a*. The traverse cam shaft 21 rotates freely about an axis that is parallel to the spool shaft 15. The slider 22 is configured and arranged to move to and fro in the longitudinal direction in response to a rotation of the traverse cam shaft 21. The slider 22 is attached to the rearward end of the spool shaft 15. The slider 22 cannot rotate and cannot move axially relative to the spool shaft.

The operation and operational effects of the reel will now be explained in more detail.

When the fishing line is to be cast, the user puts the rotor 3 into a state in which reverse rotation is prohibited using a reverse rotation preventing mechanism (not shown). The user manually inverts the bail arm 17 to the line release position by holding the bail arm 17. When the bail arm 17 is inverted to the line release position, the fishing line is readily dispensed from the spool 4.

The user then holds the fishing line with the index finger of the hand that is grasping the fishing rod and casts the fishing rod. The fishing line dispenses vigorously due to the weight of the terminal tackle.

After casting, the bail arm 17 is still in the line release position. When the user rotates the handle 1 in the reel-in direction, the rotor drive mechanism 5 causes the rotor 3 to rotate in the reel-in direction. Meanwhile, when the rotor 3 rotates in the reel-in direction, the bail inverting mechanism 18 restores the bail arm 17 to the fishing line reel-in position.

In this spinning reel, the gap 12*e* is formed between the internal circumference of the pinion gear 12 and the spool shaft 15 across the entire length of the pinion gear 12 by providing the third support part 14*c* at a position frontward of the frontward section 12*a* and the fourth support part 14*d* at a position rearward of the rearward section 12*f*. Since the outer circumference of the spool shaft 15 does not contact the internal circumference of the pinion gear 12, the friction force between the spool shaft 15 and the pinion gear 12 is less likely to increase due to flexure or longitudinal movement of the spool shaft 15 and the tendency of the rotation efficiency of the rotor 3 to decline is suppressed further.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Second Embodiment

Figure 4:
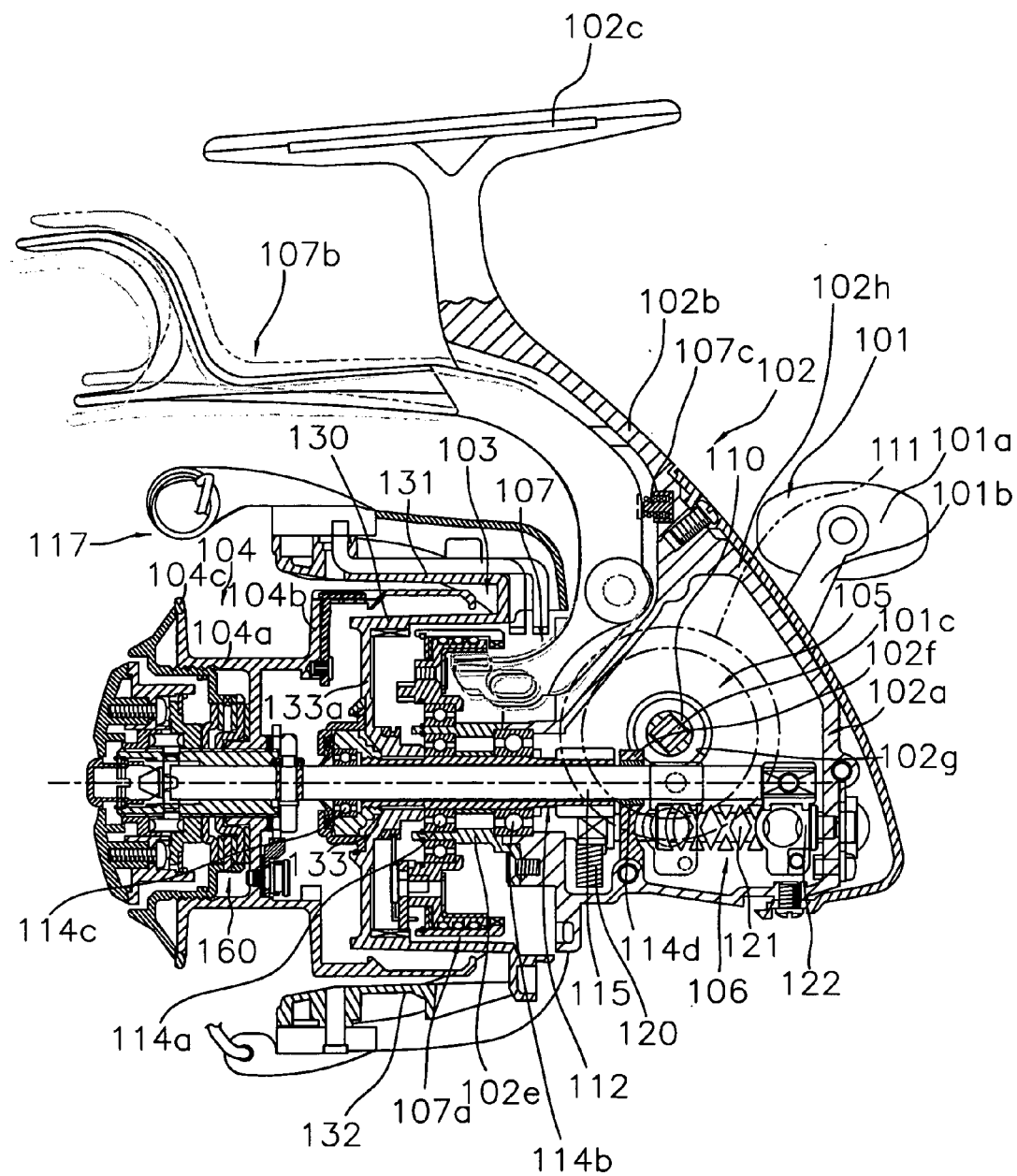
FIG. 4 is a left side cross sectional view of a spinning reel in accordance with a second embodiment of the present invention.

Referring now to FIG. 4, a spinning reel in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 5:
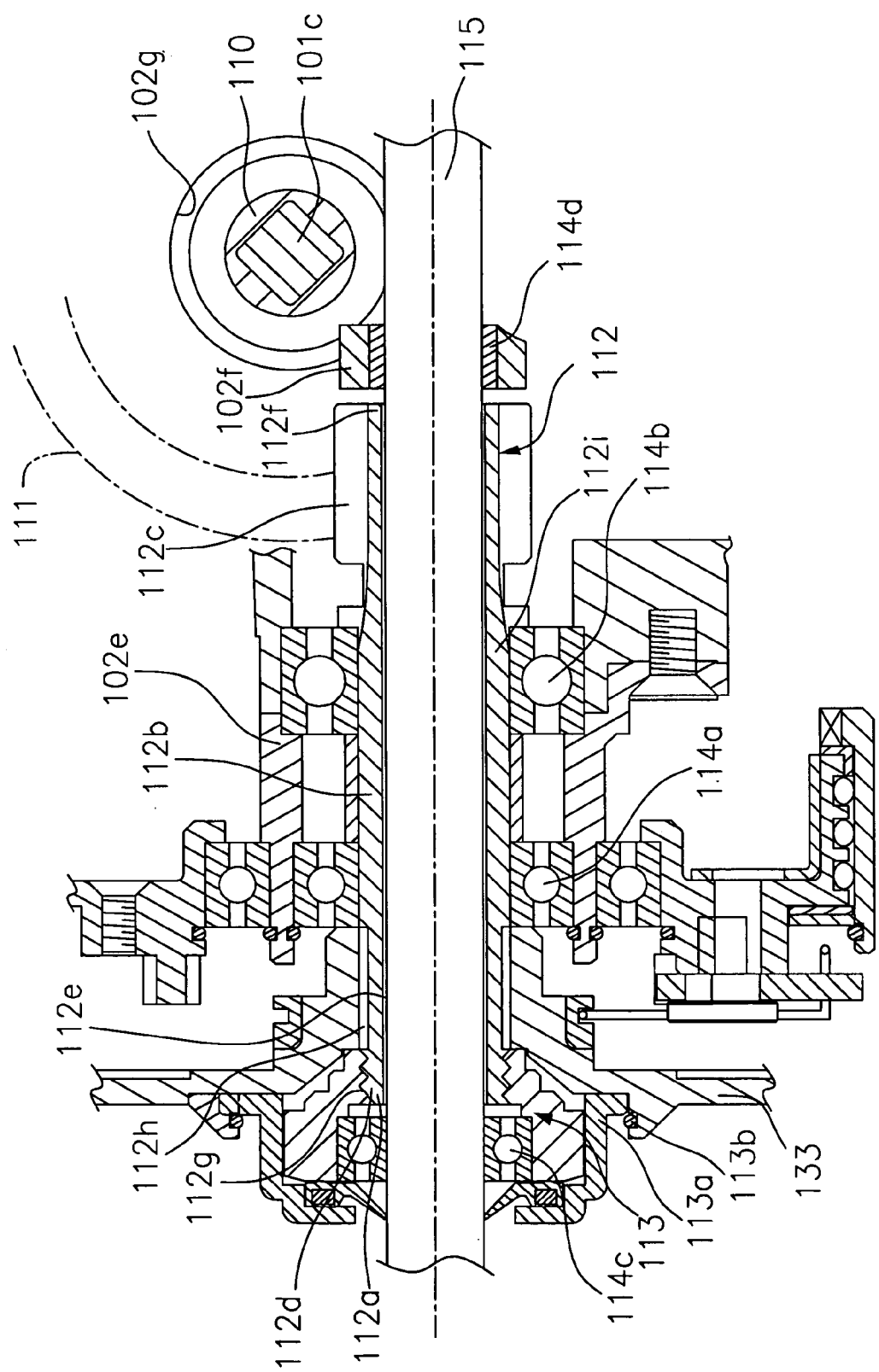
FIG. 5 is an enlarged partial side cross sectional view of a section of the spinning reel in FIG. 4 surrounding a pinion gear in accordance with the second embodiment of the present invention.

Although the first embodiment is presented using a spinning reel having a front drag mechanism 60, the present invention can also be applied to any other type of spinning reel, such as a spinning reel having a rear drag mechanism or a spinning reel having a lever brake mechanism (see FIGS. 4 and 5).

FIG. 4 shows a spinning reel in accordance with a second embodiment of the present invention. As shown in FIG. 4, this spinning reel includes a reel main unit 102, a handle 101 on the reel main unit 102, a rotor 103 and a spool 104. The rotor 103 is supported in a freely rotatable manner on a frontward portion of the reel main unit 102. The spool 104 is configured to wind (reel in) a fishing line arranged on a frontward portion of the rotor 103.

The reel main unit 102 has a reel body 102*a*, a leg section 102*b*, a mounting section 102*c*, a tubular mounting member 102*e* and a case section 102*h*. The mounting section 102*c* is configured to be mounted to a fishing rod. The mounting section 102c is elongated in a longitudinal direction. The reel body 102a is spaced apart from the mounting section 102c. The leg section 102b is configured and arranged to join the mounting section 102c and the reel body 102a together. The reel body 102a forms a mechanism installation space and the case section 102h. The case section 102h is integrally formed with the leg section 102b. The reel body 102a is open on a side portion. A lid member (not shown) obstructs the case section 102h. The tubular mounting member 102e has a flange. The tubular mounting member 102e is made of metal and is mounted to a frontward portion of the reel body 102a.

As shown in FIGS. 4 and 5, a spool shaft 115 passes through a side portion of the reel body 102a. A generally cylindrical mounting recess 102f is formed in the side portion of the reel body 102a. The mounting recess 102f is made by lathe cutting a T slot in a portion of the side of the reel body 102a that protrudes to the side. A plurality of circular through holes (not shown) is configured for a handle shaft 110 to be inserted there-through. The through holes (not shown) are formed in the reel body 102a and a side portion of the lid member (not shown). An installation recess 102g is configured to house a rolling bearing (not shown) therein. The rolling bearing (not shown) rotatably supports the handle shaft 110. The installation recess 102g is formed around each of the through holes on the inside surface of the reel body 102a and the lid member (not shown). Since the mounting recess 102f is formed by lathe cutting a T slot, the installation recess 102g is arranged in such a position that a portion of a rearward end of the mounting recess 102f overlaps with the installation recess 102g in a side view. Consequently, it is not necessary to execute machining to cut away a portion of the rearward end of the mounting recess 102f, as is required in the case of conventional spinning reels. Furthermore, a diameter of the installation recesses 102g is increased and, thus, the size of the rolling bearings used to support the handle shaft 110 is increased. As a result, the load that the rolling bearings can withstand is increased.

A rotor drive mechanism 105, an oscillating mechanism 106 and a lever brake 107 is provided inside the reel body 102a. The rotor drive mechanism 105 is configured to rotate the rotor 3. The lever brake 107 is for braking a rotation of the rotor 103 in a reel-out direction (reverse rotation direction). The oscillating mechanism 106 is configured to move the spool shaft 115 and thereby move the spool 104 to and fro in a reciprocal manner.

The rotor 103 is supported in a freely rotatable fashion on the reel main unit 102. The rotor 103 has a cylindrical section 130, a first rotor arm 131 and a second rotor arm 132. The first and second rotor arms 130 and 131 are arranged on opposite sides of the cylindrical section 130. A front wall 133 is formed on the front of the cylindrical section 130. A boss 133a having a through hole is formed in a center portion of the front wall 133. The spool shaft 115 and the pinion gear 112 pass through the through hole of the boss 133a. A bail arm 117 is mounted to a frontward end of the first rotor arm 131 and the second rotor arm 132 in such a fashion that it pivots freely. The bail arm 117 serves to guide the fishing line to the spool 104.

The spool 104 is arranged between the first rotor arm 131 and the second rotor arm 132 of the rotor 103. The spool 104 is detachably mounted to a frontward end of the spool shaft 115 in a non-rotatable fashion.

The spool 104 has a tubular bobbin trunk 104a, a tubular skirt 104b and a flange 104c. The tubular skirt 104b is formed on a rearward end of the bobbin trunk 104a. The tubular skirt 104b has a larger diameter than a diameter of the bobbin trunk 104a. The flange 104c is formed on a frontward portion of the bobbin trunk 104a. The flange 104c is configured to slant frontward.

The rotor drive mechanism 105 has a face gear 111 and a pinion gear 112. The face gear 111 is arranged and configured to rotate together with the handle shaft 110. A handle 101 is non-rotatably secured on the handle shaft 110. The pinion gear 112 is configured and arranged to mesh with the face gear 111.

The handle shaft 110 is supported in the reel main unit 102 in a freely rotatable manner. The rotor 103 is non-rotatably fastened to the pinion gear 112 with a nut member 113 installed onto the frontward section 112a.

The pinion gear 112 is a tubular member made of a stainless steel alloy. The pinion gear 112 has a frontward section 112a, a cylindrical portion 112b, a toothed section 112c, a mounting section 112d, a gap 112e, a rearward section 112f, an externally threaded section 112g, a chamfered section 112h and an intermediate section 112i. The frontward section 112a passes through the center of the rotor 103. The frontward section 112a passes through the through hole of the rotor 103 and extends toward the spool 104. As shown in FIGS. 4 and 5, the pinion gear 112 is rotatably supported with respect to the reel unit 102 at two locations along the intermediate section 112i of the pinion gear by a first support part 114a and a second support part 114b. The first support part 114a and the second support part 114b are rolling bearings.

As shown in FIG. 5, the pinion gear 112 is mounted in the reel main unit 102. The pinion gear 112 is rotatable about an axis that is generally parallel to the longitudinal direction of the fishing rod. The spool shaft 115 passes through an internal circumference of the cylindrical portion 112b. The gap 112e is formed between the spool shaft 115 and the cylindrical portion 112b. The toothed section 112c is provided on the outside circumference of a rearward section 112f of the cylindrical portion 112b. The toothed section 112c is configured to mesh with the face gear 111. The mounting section 112d is provided on an outside circumference of the frontward section 112a of the cylindrical portion 112b. The mounting section 112d is configured to be attached in a non-rotatable manner to the rotor 103.

As shown in FIG. 5, the cylindrical portion 112b is a tubular member made of a stainless steel alloy. The intermediate section 112i is rotatably supported in the reel main unit 102 at two locations by the first support part 114a and the second support part 114b.

The toothed section 112c includes helical-gear-like teeth formed on an outside circumference of the cylindrical portion 112b between the intermediate section 112i and the rearward section 112f. The toothed section 112c meshes with the face gear 111.

As shown in FIG. 5, the chamfered section 112h is made up of opposing flat surfaces formed by chamfering an outside circumference of the frontward section 112a. The externally threaded section 112g is formed on a frontward side of the chamfered section 112h. The mounting section 112d is non-rotatably attached to the rotor 103. The externally threaded section 112g is formed on the external circumferential surface of a frontward portion of the mounting section 112d. The nut member 113 is screwed onto the externally threaded section 112g. As shown in FIGS. 4 and 5, the nut member 113 is prevented from rotating by a retainer 113a. The retainer 113a is fastened to the front wall 133 of the rotor 103 with a retaining ring 113b.

As shown in FIG. 5, the first and second support parts 114a and 114b are rolling bearings installed in two locations on an outside circumference of the intermediate section 112i. Outer races of the first and second support parts 114a and 114b are mounted in internal circumferential sections of the mounting member 102e. Inner races of the first and second support parts 114a and 114b are mounted to the intermediate section 112i. The intermediate section 112i is located rearward of the chamfered section 112h. The intermediate section 112i is located frontward of the toothed section 112c. Since the first support part 114a and the second support part 114b are arranged in such positions that they support the intermediate section 112i, the overall length of the pinion gear 112 is shortened.

As shown in FIGS. 4 and 5, the spool shaft 115 is made of a stainless steel alloy. The spool 104 is connected to the frontward end of the spool shaft 115 with a drag mechanism 160 disposed there-between. The outside circumference of the spool shaft 115 is supported in a freely rotatable manner at a position frontward of the frontward section 112a by a third support part 114c and at a position rearward of the rearward section 112f by a fourth support part 114d.

As shown in FIG. 5, the third support part 114c is a rolling bearing mounted on the outside circumference of the spool shaft 115. An outer race of the third support part 114c is mounted in an internal circumferential section of a frontward end of the nut member 113. An inner race of the third support part 114c is mounted on the outer circumference of the spool shaft 115 at a position frontward of the frontward section 112a.

As shown in FIG. 5, the fourth support part 114d is a tubular member made of a synthetic resin. The fourth support part 114d constitutes a bushing or other general-purpose sliding bearing. The outside circumference of the fourth support part 114d is installed inside the internal circumference of the mounting recess 102f. The internal circumference of the fourth support part 114d is mounted on the outer circumference of the spool shaft 115 at a position rearward of the rearward section 112f.

Referring to FIG. 4, the oscillating mechanism 106 is a traverse cam mechanism having an intermediate gear 120, a screw shaft 121 and a slider 122. The intermediate gear 120 is configured and arranged to mesh with the toothed section 112c of the pinion gear 112. The screw shaft 121 is rotatably mounted in the reel body 102a. The screw shaft 121 freely rotates about an axis that is parallel to the spool shaft 115. The slider 122 is configured and arranged to move to and fro in the longitudinal direction in response to rotation of the screw shaft 121. The slider 122 is attached to the rearward end of the spool shaft 115. The slider 122 cannot rotate and cannot move axially relative to the spool shaft 115.

The lever brake 107 includes a brake unit 107a, a brake lever 107b and a coil spring 107c. The brake lever 107b is for adjusting the braking force exerted by the brake unit 107a. The coil spring 107c is arranged and configured to spring load the brake lever 107b in a direction of separation from the mounting section 102c.

The operation and operational effects of the reel will now be explained in more detail.

When the fishing line is to be cast, the user moves the bail arm 117 to the line release position. The casting motion causes the fishing line to be dispensed (unwound) from the outside circumference of the spool 104. When the fishing line is to be reeled in, the user rotates the handle 101 in the reel-in direction and the bail arm 117 returns to the line reel-in position by a return mechanism (not shown). The torque of the handle 101 is transferred to the pinion gear 112 through the handle shaft 110 and the face gear 111. The torque transferred to the pinion gear 112 is transferred to the rotor 103 through the front section 112a of the pinion gear 112. When the pinion gear 112 rotates, the spool shaft 115 moves reciprocally to and fro in the longitudinal direction.

In order to allow reverse rotation of the rotor 103 while fishing, the user pulls the brake lever 107b toward the mounting section 102c using, for example, an index finger and adjusts the braking force.

Similar to the previous embodiment, in this spinning reel, the gap 112e exists between the internal circumference of the pinion gear 112 and the spool shaft 115 across the entire length of the pinion gear 112 by providing the third and fourth support parts 114c and 114d. The third support part 114c supports the outer circumference of the spool shaft 115 at a position frontward of the frontward section 112a. The fourth support part 114d supports the outer circumference of the spool shaft 115 at a position rearward of the rearward section 112f. Since the outer circumference of the spool shaft 115 does not contact the internal circumference of the pinion gear 112, the friction force between the spool shaft 115 and the pinion gear 112 is less likely to increase due to flexure or longitudinal movement of the spool shaft 115 and the tendency of the rotation efficiency of the rotor 103 to decline is suppressed further.

Third Embodiment

Figure 6:
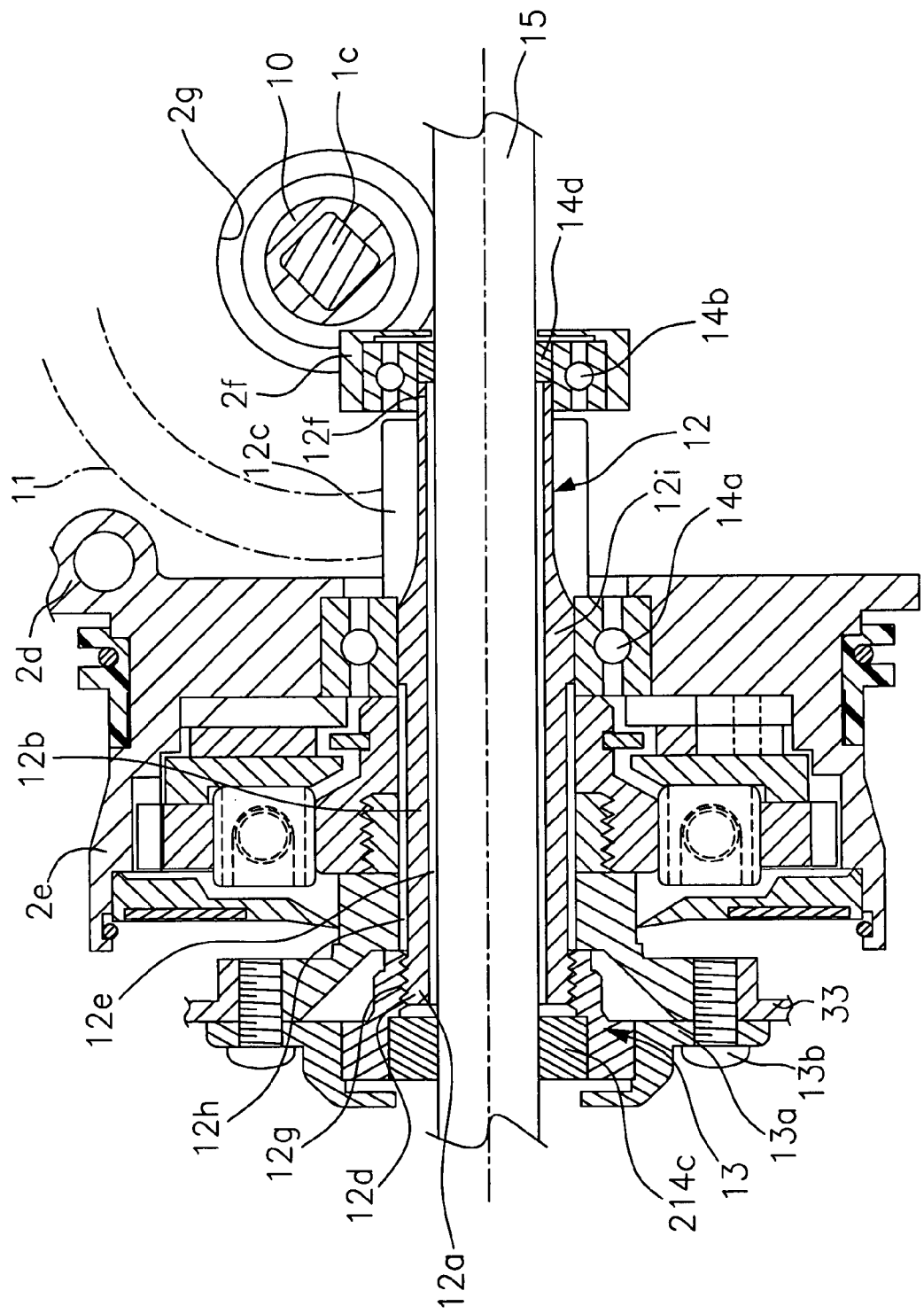
FIG. 6 is an enlarged partial side cross sectional view of a section of a spinning reel surrounding a pinion gear in accordance with a third embodiment of the present invention.

Referring now to FIG. 6, a spinning reel in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The spinning reel of the third embodiment is basically the same as the first embodiment except that the third support part 14c of the first embodiment is replaced with a third support part 214c. The third support part 214c is a sliding bearing, as shown in FIG. 6. It will be apparent to one of ordinary skill in the art from this disclosure that it is also acceptable to use any desired combination of rolling bearings and sliding bearings for the first support part 14a, the second support part 14b and the fourth support part 14d. Furthermore, it will be apparent to one of ordinary skill in the art from this disclosure that the sliding bearing is not limited to a bushing member made of a synthetic resin material. It is also acceptable to use other materials.

Fourth Embodiment

Figure 7:
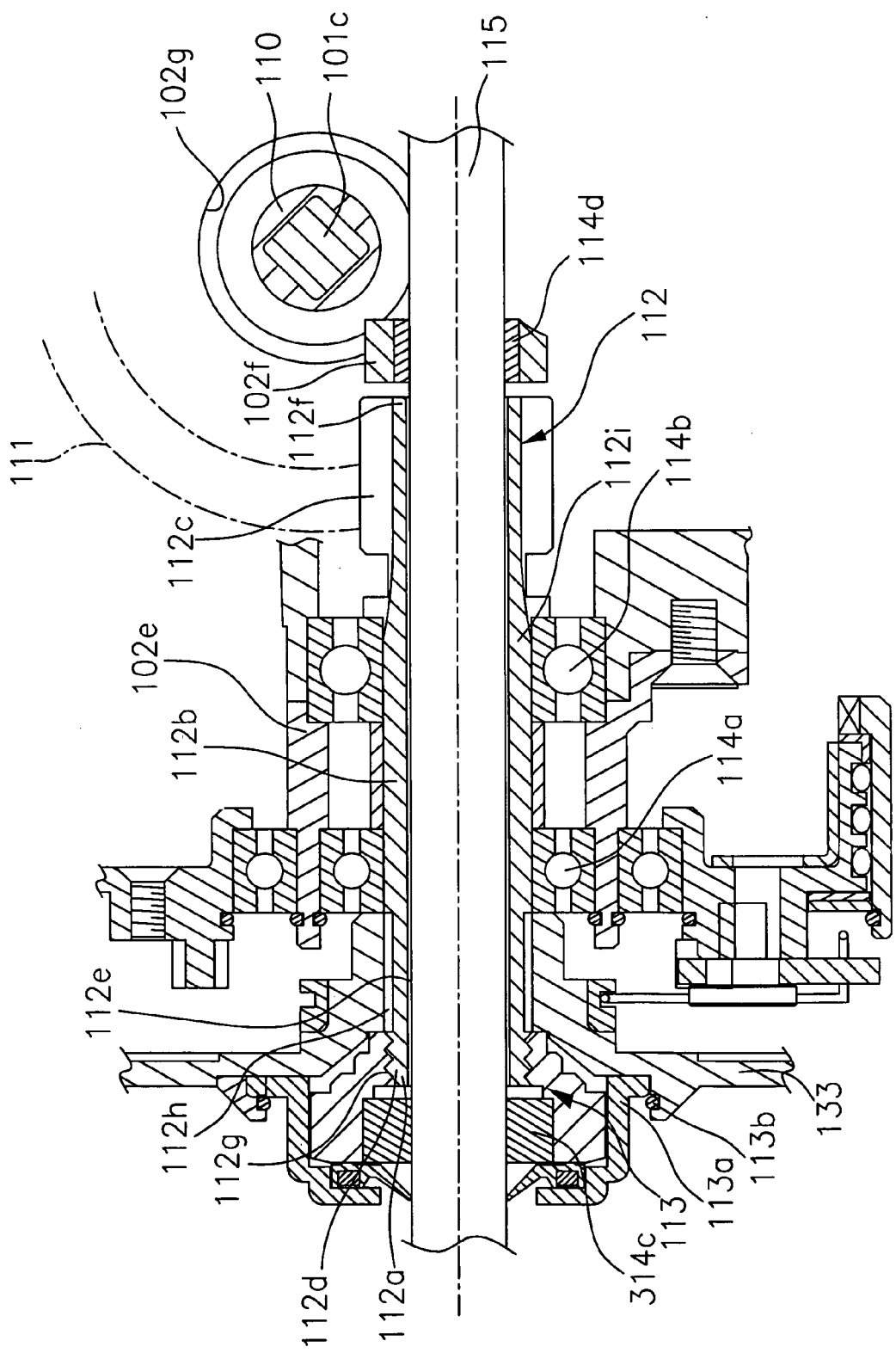
FIG. 7 is an enlarged partial side cross sectional view of a section of a spinning reel surrounding a pinion gear in accordance with a fourth embodiment of the present invention.

Referring now to FIG. 7, a spinning reel in accordance with a fourth embodiment will now be explained. In view of the similarity between the second and fourth embodiments, the parts of the fourth embodiment that are identical to the parts of the second embodiment will be given the same reference numerals as the parts of the second embodiment. Moreover, the descriptions of the parts of the fourth embodiment that are identical to the parts of the second embodiment may be omitted for the sake of brevity.

The spinning reel of the fourth embodiment is basically the same as the second embodiment except that the third support part 114c of the first embodiment is replaced with a third support part 314c. The third support part 314c is a sliding bearing, as shown in FIG. 7. It will be apparent to one of ordinary skill in the art from this disclosure that it is also acceptable to use any desired combination of rolling bearings and sliding bearings for the first support part 114a, the second support part 114b and the fourth support part 114d. Furthermore, it will be apparent to one of ordinary skill in the art from this disclosure that the sliding bearing is not limited to a bushing member made of a synthetic resin material. It is also acceptable to use other materials.

Fifth Embodiment

Figure 8:
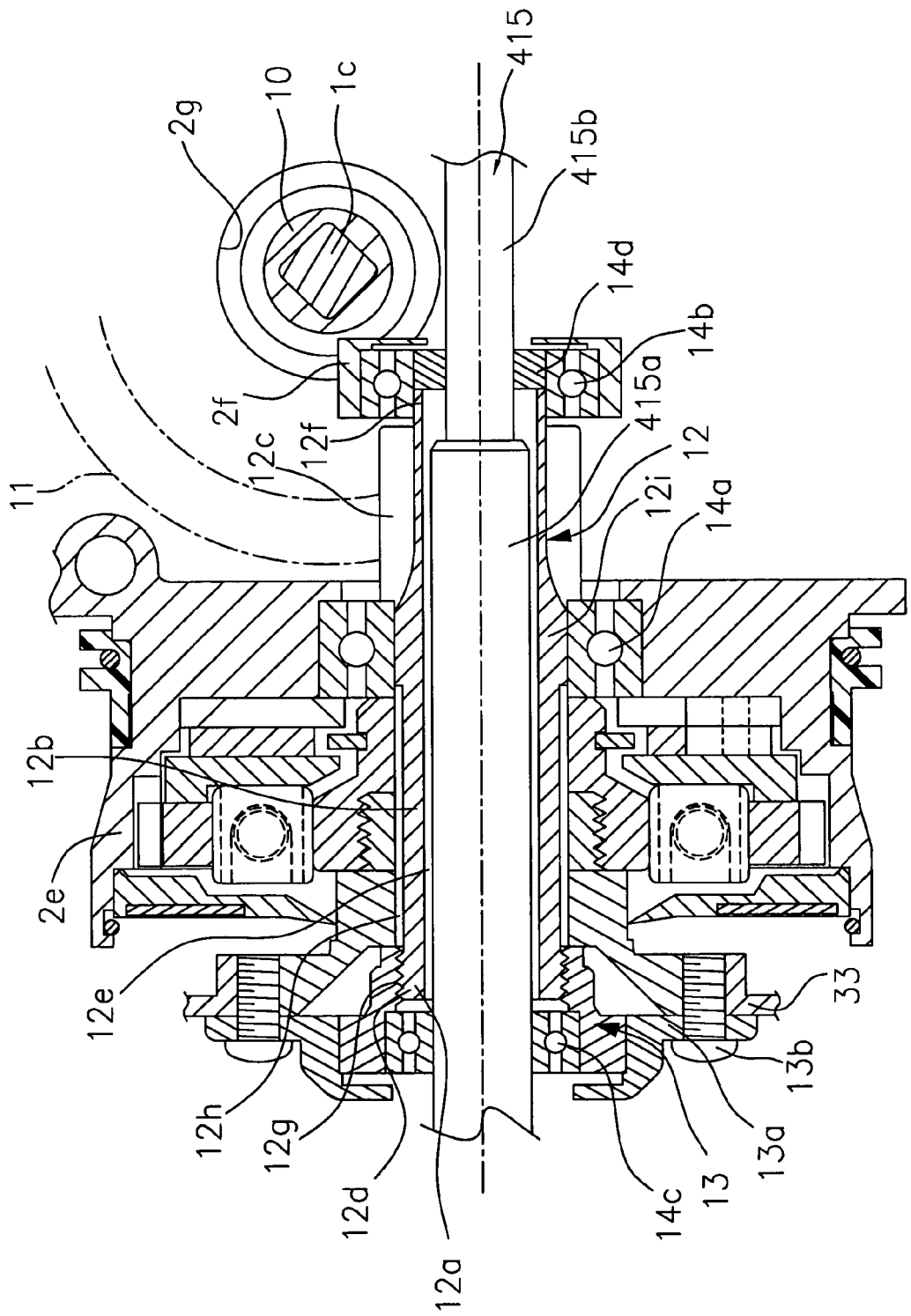
FIG. 8 is an enlarged partial side cross sectional view of a section of a spinning reel in surrounding a pinion gear in accordance with a fifth embodiment of the present invention.

Referring now to FIG. 8, a spinning reel in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The fifth embodiment is basically the same as the first embodiment except that the spinning reel of the fifth embodiment has a spool shaft 415 with a first shaft section 415a and a second shaft section 415b. As shown in FIG. 8. The first shaft section 415a is arranged and configured with a rearward end that is positioned frontward of the fourth support part 14d when the spool shaft 415 is moved to its most rearward position. The first shaft section 415a is supported by the third support part 14c. The second shaft section 415b is formed on the rearward end of the first shaft section 415a. The second shaft section 415b has a smaller diameter than a diameter of the first shaft section 415a. The second shaft section 415b is supported by the fourth support part 14d. With this spinning reel, since the second shaft section 415b has a smaller diameter than the diameter of the first shaft section 415a, a unit weight of the second shaft section 415b at the fourth support part 14d is reduced in comparison with a conventional configuration in which a larger diameter first shaft section is supported on a pair of support parts provided inside the pinion gear. Likewise, by reducing the unit weight of the second shaft section 415b at the fourth support part 14d, the friction force between the fourth support part 14d and the spool shaft 415 is reduced and the tendency of the sliding efficiency of the spool shaft 415 to decline is suppressed.

Sixth Embodiment

Figure 9:
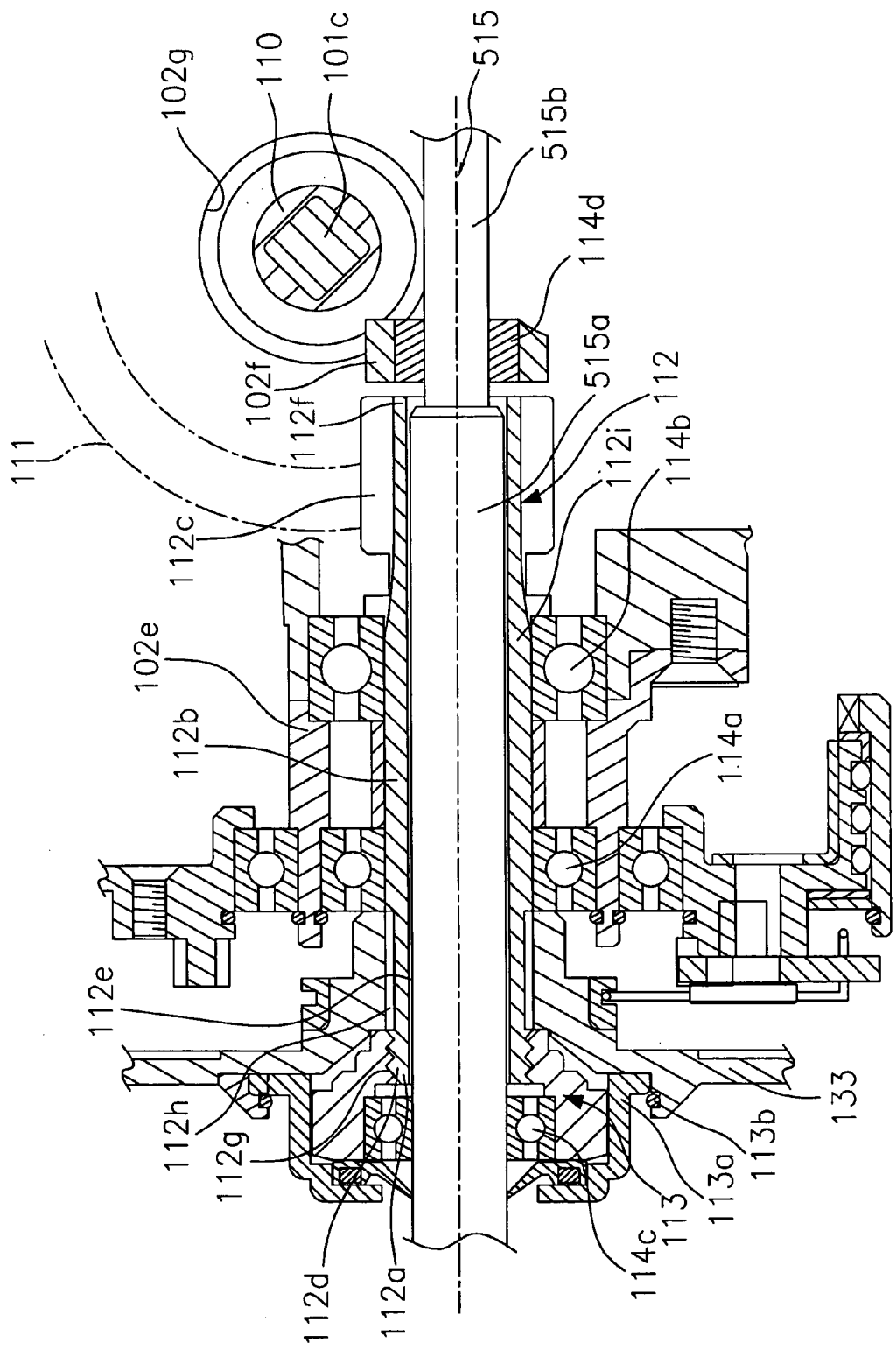
FIG. 9 is an enlarged partial side cross sectional view of a section of a spinning reel surrounding a pinion gear in accordance with a sixth embodiment of the present invention.

Referring now to FIG. 9, a spinning reel in accordance with a sixth embodiment will now be explained. In view of the similarity between the second and sixth embodiments, the parts of the sixth embodiment that are identical to the parts of the second embodiment will be given the same reference numerals as the parts of the second embodiment. Moreover, the descriptions of the parts of the sixth embodiment that are identical to the parts of the second embodiment may be omitted for the sake of brevity.

The sixth embodiment is basically the same as the second embodiment except that the spinning reel of the sixth embodiment has a spool shaft 515 with a first shaft section 515a and a second shaft section 515b. As shown in FIG. 9. The first shaft section 515a is arranged and configured with a rearward end that is positioned frontward of the fourth support part 114d when the spool shaft 515 is moved to its most rearward position. The first shaft section 515a is supported by the third support part 114c. The second shaft section 515b is formed on the rearward end of the first shaft section 515a. The second shaft section 515b has a smaller diameter than a diameter of the first shaft section 515a. The second shaft section 515b is supported by the fourth support part 114d. With this spinning reel, since the second shaft section 515b has a smaller diameter than the diameter of the first shaft section 515a, a unit weight of the second shaft section 515b at the fourth support part 114d is reduced in comparison with a conventional configuration in which a larger diameter first shaft section is supported on a pair of support parts provided inside the pinion gear. Likewise, by reducing the unit weight of the second shaft section 515b at the fourth support part 114d, the friction force between the fourth support part 114d and the spool shaft 515 is reduced and the tendency of the sliding efficiency of the spool shaft 515 to decline is suppressed.

Seventh Embodiment

Figure 10:
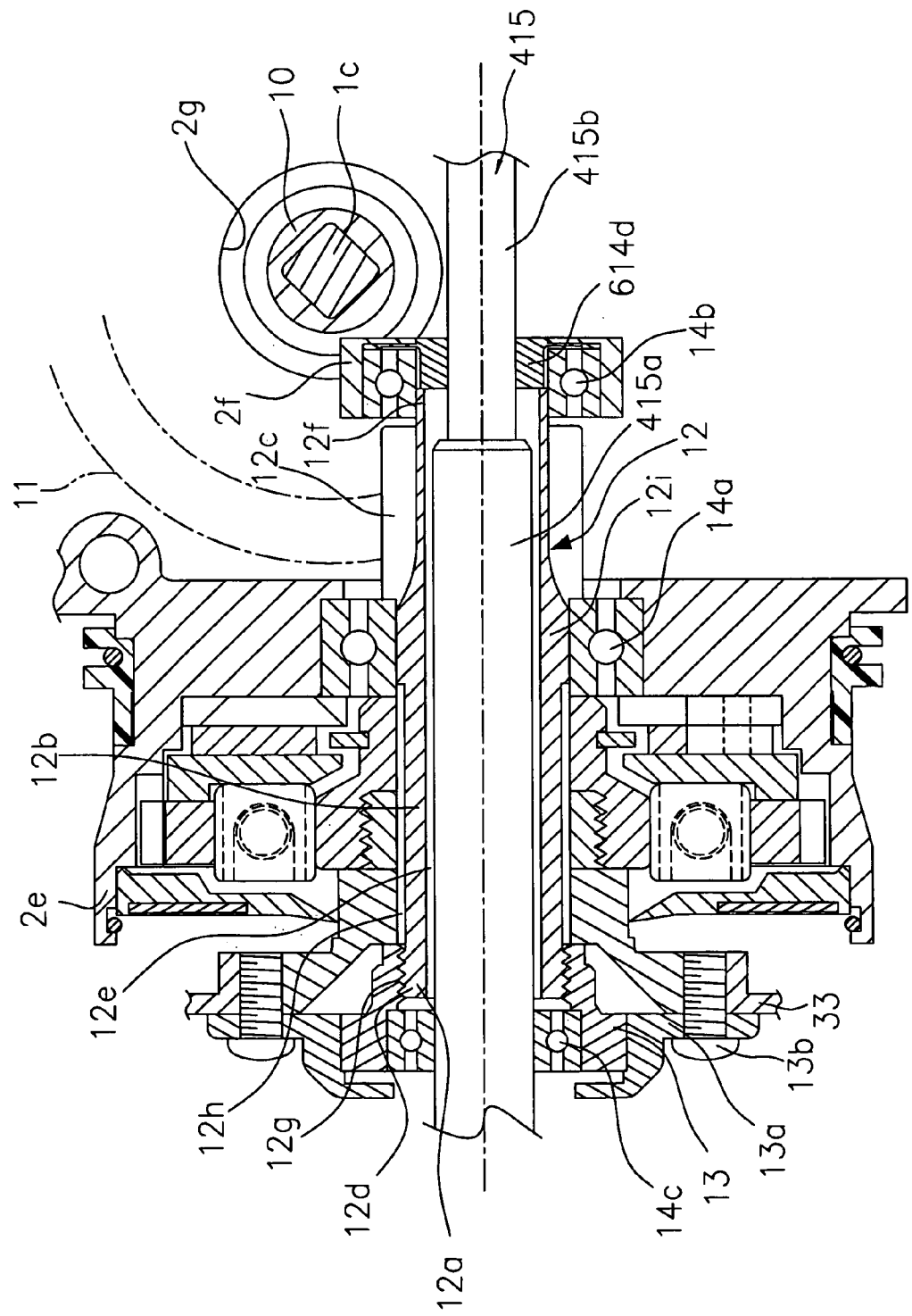
FIG. 10 is an enlarged partial side cross sectional view of a section of a spinning reel surrounding a pinion gear in accordance with a seventh embodiment of the present invention.

Referring now to FIG. 10, a spinning reel in accordance with a seventh embodiment will now be explained. In view of the similarity between the fifth and seventh embodiments, the parts of the seventh embodiment that are identical to the parts of the fifth embodiment will be given the same reference numerals as the parts of the first embodiment. Moreover, the descriptions of the parts of the seventh embodiment that are identical to the parts of the fifth embodiment may be omitted for the sake of brevity.

The seventh embodiment is basically the same as the fifth embodiment except that the spinning reel of the seventh embodiment has a fourth support part 614d that has a rear end that is positioned further rearward than the rearward end of the second support part 14b, as shown in FIG. 10. The fourth support part 614d is not supported in the internal circumferential section of the rearward end of the second support part 14b. Instead, the fourth support part 614d is supported in the internal circumference of the mounting recess 2f in which the second support part 114b is installed. Since the mounting recess 2f supports both the fourth support part 614d and the second support part 14b, this arrangement simplifies the spool shaft support structure.

Eighth Embodiment

Figure 11:
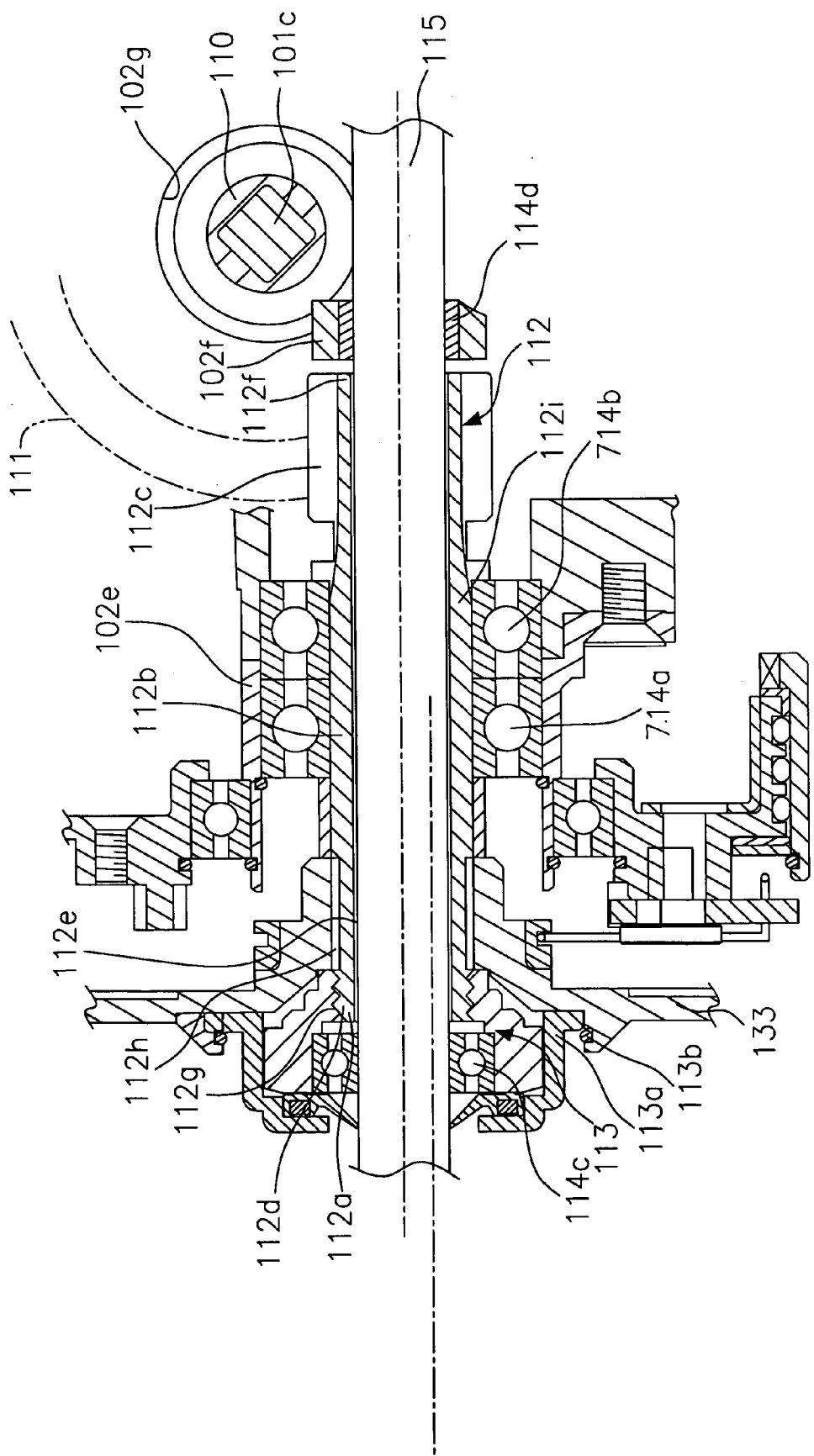
FIG. 11 is an enlarged partial side cross sectional view of a section of a spinning reel surrounding a pinion gear in accordance with an eighth embodiment of the present invention.

Referring now to FIG. 11, a spinning reel in accordance with an eighth embodiment will now be explained. In view of the similarity between the second and eighth embodiments, the parts of the eighth embodiment that are identical to the parts of the second embodiment will be given the same reference numerals as the parts of the second embodiment. Moreover, the descriptions of the parts of the eighth embodiment that are identical to the parts of the second embodiment may be omitted for the sake of brevity.

The eighth embodiment is basically the same as the second embodiment except that the spinning reel of the eighth embodiment has a first support part 714a that is arranged closely adjacent to the frontward side of the second support part 114b. By adopting such a configuration, the overall size of the entire reel is suppressed because the first support part 714a and the second support part 114b are arranged closely adjacent to each other in front of the toothed section 112c.

Ninth Embodiment

Figure 12:
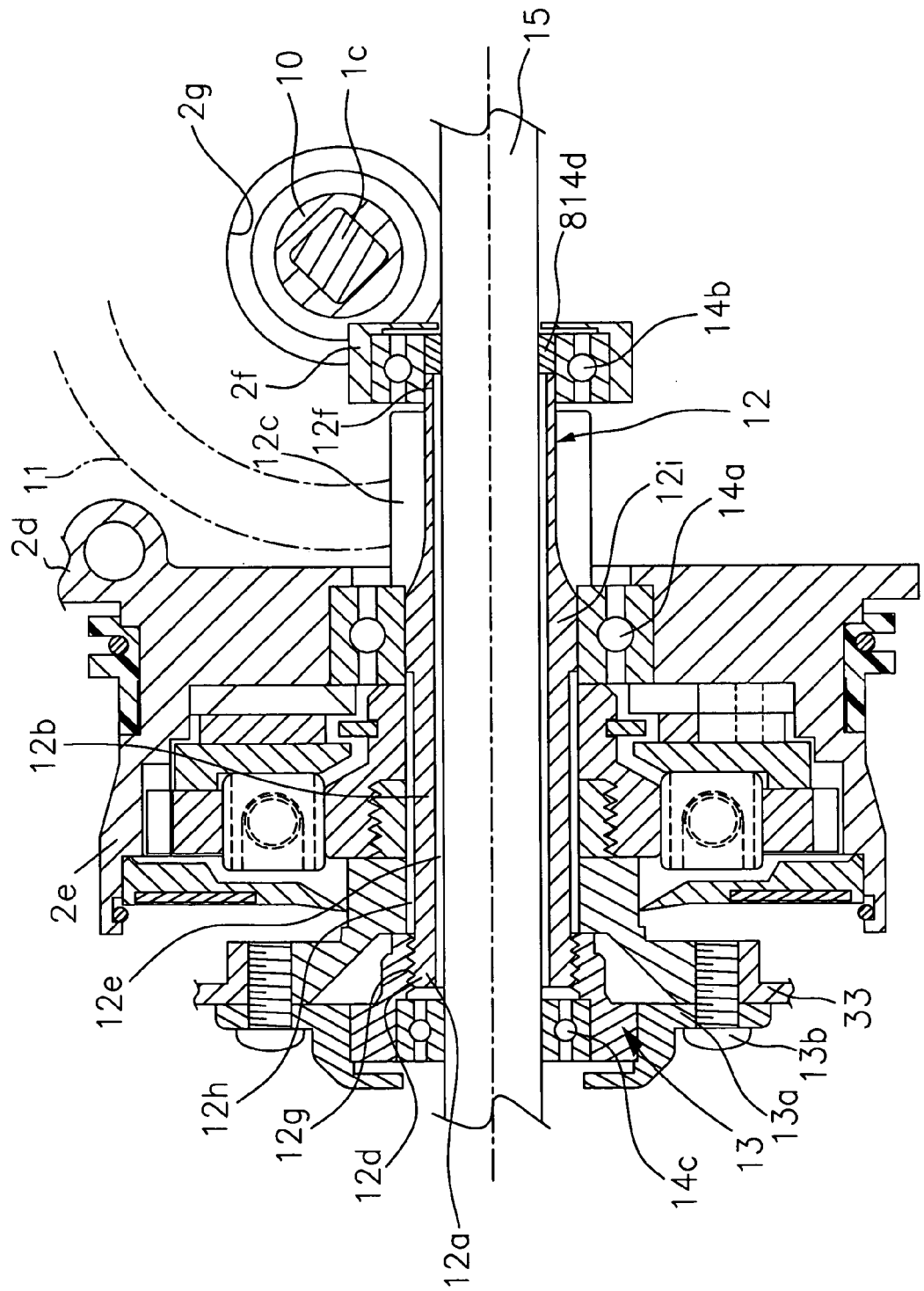
FIG. 12 is an enlarged partial side cross sectional view of a section of a spinning reel surrounding a pinion gear in accordance with a ninth embodiment of the present invention.

Referring now to FIG. 12, a spinning reel in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The ninth embodiment is basically the same as the first embodiment except that the spinning reel of the ninth embodiment has a fourth support part 814d with a rearward end that is positioned further frontward than the rearward end of the second support part 14b. Thus, the length of the entire support structure of the spool shaft 15 in the longitudinal direction is shortened.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel comprising:
   a reel main unit configured to be mounted to a fishing rod and having a handle;
   a spool shaft installed in the reel main unit, the spool shaft being movable along a longitudinal direction;
   a spool mounted on a frontward end of the spool shaft and configured to have fishing line wound onto an outer circumference of the spool;
   a rotor arranged to rotate around the outer circumference of the spool and configured to wind the fishing line onto the spool;
   a face gear rotatably supported on the reel main unit, the handle of the reel main unit being non-rotatably mounted to the face gear;
   a pinion gear having a cylindrical portion with an internal circumference configured and arranged for the spool shaft to pass through the internal circumference with a gap between the spool shaft and the internal circumference, a toothed section disposed on an outside circumference of a rearward section of the cylindrical portion and configured to mesh with the face gear, and a mounting section disposed on an outside circumference of a frontward section of the cylindrical portion and configured to be attached in a non-rotatable manner to the rotor;
   a nut member disposed at a frontward end of the cylindrical portion to fasten the rotor to the mounting section of the pinion gear;
   a first support part mounted in the reel main unit to rotatably support the cylindrical portion;
   a second support part mounted in the reel main unit in a position rearward of the first support part to rotatably support the cylindrical portion;
   a third support part mounted in the nut member to support the spool shaft at a position frontward of the frontward end of the cylindrical portion; and
   a fourth support part configured to support the spool shaft at a position rearward of a rearward end of the cylindrical portion,
   the spool shaft having a first shaft section and a second shaft section with a smaller diameter than a diameter of the first shaft section, the first shaft section having a rearward end that is positioned frontward of the fourth support part and an outside circumference that is supported by the third support part, the second shaft section being formed at the rearward end of the first shaft section, and the second shaft section having an outside circumference that is supported by the fourth support part.

2. The spinning reel as recited in claim 1, wherein the second support part has an internal circumference with a frontward end portion that supports the rearward end of the cylindrical portion and a rearward end portion that supports the fourth support part.

3. The spinning reel as recited in claim 2, wherein the fourth support part has a rearward end that is positioned either in a same position as a rearward end of the second support part or further frontward than the rearward end of the second support part.

4. The spinning reel as recited in claim 2, wherein the fourth support part has a rearward end that is positioned further rearward than a rearward end of the second support part.

5. The spinning reel as recited in claim 1, wherein the fourth support part has a rearward end that is positioned further rearward than a rearward end of the second support part.

6. The spinning reel as recited in claim 1, wherein the second support part supports a portion of the cylindrical portion frontward of the toothed section, and the fourth support part is installed in the reel main unit.

7. The spinning reel as recited in claim 1, wherein the first support part and the second support part are rolling bearings.

8. The spinning reel as recited in claim 1, wherein the fourth support part is a sliding bearing.

9. The spinning reel as recited in claim 8, wherein the fourth support part is made of a synthetic resin.

10. The spinning reel as recited in claim 1, wherein the spool shaft and the pinion gear are each made of a stainless steel alloy.

11. The spinning reel as recited in claim 1, wherein the rearward end of the first shaft section is frontward of a rearward end of the pinion gear.

* * * * *